United States Patent
Oba et al.

(10) Patent No.: US 10,046,645 B2
(45) Date of Patent: Aug. 14, 2018

(54) MOTOR DRIVE APPARATUS, METHOD OF CONTROLLING MOTOR DRIVE APPARATUS, AND ELECTRICALLY POWERED VEHICLE

(71) Applicant: Toyota Jidosha Kabushiki Kaisha, Toyota-shi, Aichi-ken (JP)

(72) Inventors: Tomoko Oba, Nagoya (JP); Atsushi Nomura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 225 days.

(21) Appl. No.: 15/229,627

(22) Filed: Aug. 5, 2016

(65) Prior Publication Data

US 2017/0050525 A1    Feb. 23, 2017

(30) Foreign Application Priority Data

Aug. 19, 2015    (JP) ................. 2015-161707

(51) Int. Cl.
| | |
|---|---|
| *B60L 11/02* | (2006.01) |
| *B60L 11/18* | (2006.01) |
| *H02H 7/122* | (2006.01) |
| *H02M 1/32* | (2007.01) |
| *H02P 29/032* | (2016.01) |
| *H02M 3/158* | (2006.01) |
| *H02M 1/00* | (2006.01) |

(52) U.S. Cl.
CPC ............. *B60L 11/02* (2013.01); *B60L 11/18* (2013.01); *H02H 7/122* (2013.01); *H02M 1/32* (2013.01); *H02P 29/032* (2016.02); *H02M 3/158* (2013.01); *H02M 2001/007* (2013.01)

(58) Field of Classification Search
CPC .................................. B60L 11/02; B60L 11/18
See application file for complete search history.

(56) References Cited

U.S. PATENT DOCUMENTS

| | | | | |
|---|---|---|---|---|
| 9,827,857 | B2* | 11/2017 | Suzuki | .............. H02M 7/44 |
| 2012/0249155 | A1* | 10/2012 | Bruckhaus | .............. B60L 3/003 |
| | | | | 324/537 |

FOREIGN PATENT DOCUMENTS

JP    2009-060726 A    3/2009

* cited by examiner

*Primary Examiner* — Hai L Nguyen
(74) *Attorney, Agent, or Firm* — Dinsmore & Shohl LLP (57) ABSTRACT

An ECU (Electronic Control Unit) controls a converter such that the converter is stopped when a fail signal FCV is output. The ECU further controls an inverter such that power operation and regenerative operation by a motor generator are performed in a state in which output of an ON signal to an IGBT (Insulated Gate Bipolar Transistor) element is set non-executable, when the fail signal FCV is output due to the IGBT element becoming short-circuited.

3 Claims, 4 Drawing Sheets

MOTOR DRIVE APPARATUS, METHOD OF CONTROLLING MOTOR DRIVE APPARATUS, AND ELECTRICALLY POWERED VEHICLE

CROSS-REFERENCE TO RELATED APPLICATIONS

This application claim priority to Japanese Patent Application No. 2015-161707 filed on Aug. 19, 2015, the entire contents of which are hereby incorporated by reference.

BACKGROUND

Field

The present disclosure relates to a motor drive apparatus, a method of controlling a motor drive apparatus, and an electrically powered vehicle, and more particularly to a motor drive apparatus including a converter between a power storage device and an inverter, a method of controlling the motor drive apparatus, and an electrically powered vehicle including a converter between a power storage device and an inverter.

Description of the Background Art

The vehicle disclosed in Japanese Patent Laying-Open No. 2009-60726 includes a battery, an inverter, a boost converter provided between the battery and the inverter, and a smoothing capacitor for smoothing voltage of the inverter. The boost converter includes an upper anti and a lower arm. Each of the upper arm and the lower arm includes an IGBT (Insulated Gate Bipolar Transistor) element and a diode connected in anti-parallel with the IGBT element.

This vehicle further includes an overvoltage protection circuit that limits the operation of the boost converter when the voltage of the smoothing capacitor exceeds an overvoltage threshold. In this vehicle, when an abnormality occurs in the overvoltage protection circuit, upper arm ON running is performed. The upper arm ON running refers to running performed in a state in which the upper IGBT element is fixed ON and the lower IGBT element is fixed OFF (upper arm ON state). During upper arm ON running, voltage boost by the boost converter is not performed. This vehicle, therefore, is able to run while preventing overvoltage of the smoothing capacitor when an abnormality occurs in the overvoltage protection circuit.

This vehicle runs in a state in which the boost converter is shut down when an abnormality occurs in the boost converter. In this case, since the boost converter is shut down, boosting voltage by the boost converter is not performed. In this vehicle, therefore, overvoltage of the smoothing capacitor can be prevented also when an abnormality occurs in the boost converter.

In the vehicle disclosed in Japanese Patent Laying-Open No. 2009-60726, since the boost converter is shut down during running in a state in which the boost converter has an abnormality, power supply from the battery to the inverter is performed, whereas power supply from the inverter to the battery is not performed. Accordingly, electricity is merely discharged from the battery during running, so that running can continue only for a short distance determined by the amount of charge of the battery.

Meanwhile, when the abnormality in the boost converter is a short circuit in the (upper) IGBT element (switching element) included in the upper arm, the upper arm ON running can be performed. In the upper arm ON running, electric power generated by the motor connected to the inverter can be supplied to the battery, thereby increasing the distance of travel.

The inventors of the present disclosure, however, have found that the converter generates a fail signal when an ON signal is input to the short-circuited switching element in order to perform the upper arm ON running. Suppose that in a system in which the converter generates a fail signal when the switching element is short-circuited, when a fail signal is generated by the converter, an ON signal is input to the short-circuited upper switching element in order to perform the upper arm ON running. In such a system, during short-circuiting of the upper switching element, generation of a fail signal associated with input of an ON signal to the upper switching element and input of an ON signal to the upper switching element associated with generation of a fail signal are repeated, and the upper arm ON running fails to be performed.

SUMMARY

The present disclosure is made in order to solve the aforementioned problem. An object of the present disclosure is to provide a motor drive apparatus capable of performing upper arm ON running of the converter when a short-circuit abnormality occurs in the upper switching element included in the converter.

A motor drive apparatus according to an aspect of the present disclosure includes a power storage device, an inverter, a converter, and a control device. The inverter is configured to drive a motor. The converter is provided between the power storage device and the inverter and configured to boost input voltage of the inverter to a voltage equal to or higher than voltage of the power storage device. The control device is configured to control the inverter and the converter. The converter includes an upper switching element connected between a positive electrode line of a power line pair connected to the power storage device and a positive electrode line on a direct current side of the inverter, and a lower switching element connected between the power line pair. The converter is configured to output a fail signal when the upper switching element becomes short-circuited or when an ON signal is input to the upper switching element in a short-circuited state. The control device is configured to control the converter to be stopped when the fail signal is output. The control device is configured to control the inverter such that power operation and regenerative operation by the motor are performed in a state in which output of an ON signal to the upper switching element is set non-executable, when the fail signal is output due to short circuit of the upper switching element.

In this motor drive apparatus, power operation and regenerative operation by the motor are performed in a state in which output of an ON signal to the short-circuited upper switching element is set non-executable. In this motor drive apparatus, therefore, generation of a fail signal associated with input of an ON signal to the upper switching element and input of an ON signal to the upper switching element associated with generation of a fail signal are not repeated during short-circuiting of the upper switching element, and upper arm ON running can be achieved.

The foregoing and other objects, features, aspects and advantages of the present disclosure will become more apparent from the following detailed description of the present disclosure when taken in conjunction with the accompanying drawings.

DETAILED DESCRIPTION

Embodiments of the present disclosure will be described in details below with reference to the drawings. It is noted that in the figures the same or corresponding parts are denoted with the same reference signs and a description thereof will not be repeated.

First Embodiment

<Configuration of Hybrid Vehicle>

Figure 1:
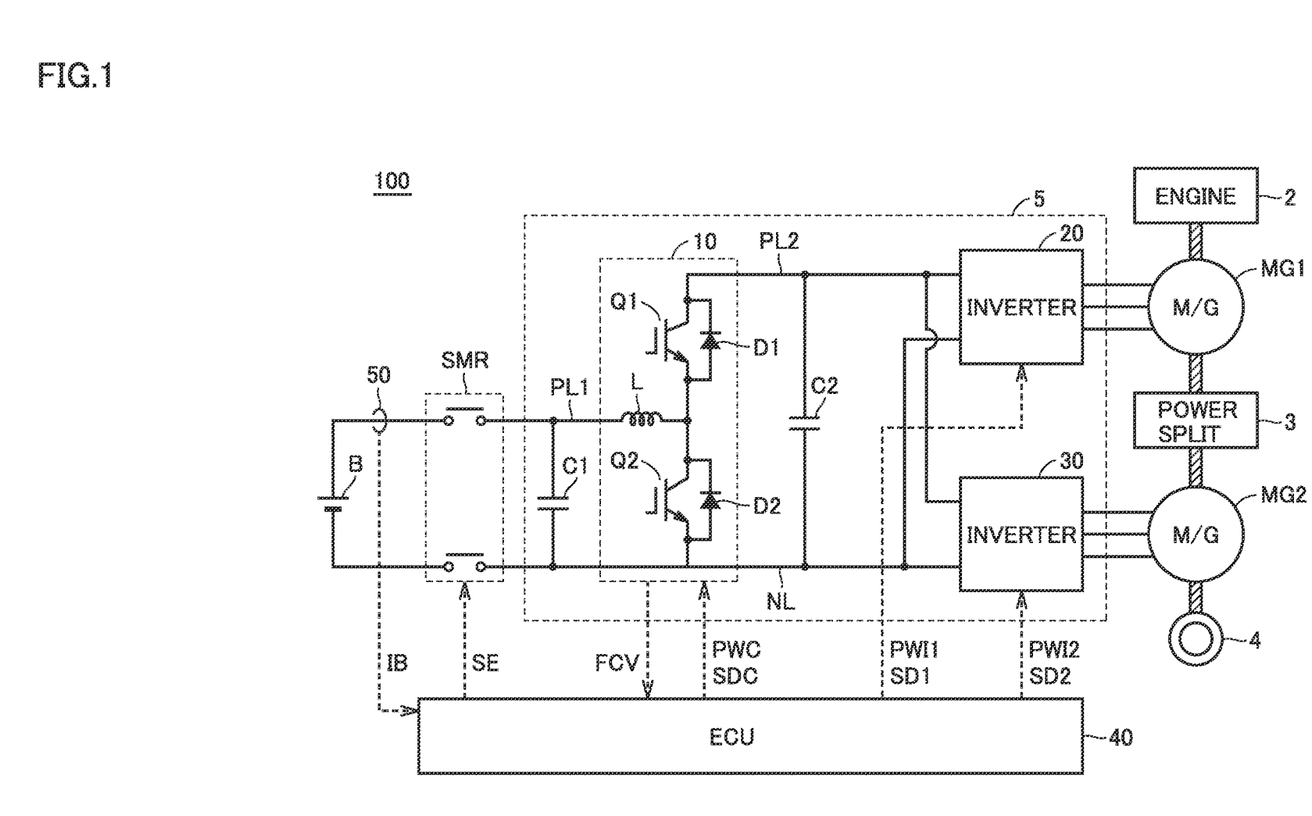
FIG. 1 is an overall configuration diagram showing an electrical configuration of a hybrid vehicle.

FIG. 1 is an overall configuration diagram showing an electrical configuration of a hybrid vehicle illustrated as an example of an electrically powered vehicle equipped with a motor drive apparatus according to the present embodiment. Referring to FIG. 1, this hybrid vehicle 100 includes an engine 2, a power splitting device 3, wheels 4, and motor generators MG1, MG2. Hybrid vehicle 100 further includes a power storage unit B, a system main relay SMR, a power control unit (which hereinafter may be referred to as "PCU") 5, an electronic control unit (which hereinafter may be referred to as "ECU") 40, and a current sensor 50.

Engine 2 and motor generators MG1, MG2 are coupled to power splitting device 3. Hybrid vehicle 100 runs with driving force from at least one of engine 2 and motor generator MG2. The power generated by engine 2 is split into two paths by power splitting device 3. That is, one is a path transmitted to wheels 4, and the other is a path transmitted to motor generator MG1.

Motor generators MG1, MG2 are alternating current (AC) electric rotating machines. For example, motor generators MG1, MG2 each are a three-phase AC synchronous motor having permanent magnets embedded in a rotor.

Motor generator MG1 produces counter electromotive force (power generation) using kinetic energy of engine 2 split by power splitting device 3. The counter electromotive force is then converted from AC into direct current (DC) by an inverter 20 (described later) of PCU 5 to be supplied to power storage unit B with the voltage adjusted by converter 10. The operation of motor generators MG1, MG2 producing counter electromotive force is hereinafter referred to as regenerative operation.

Motor generator MG2 produces driving force using at least one of electric power stored in power storage unit B and electric power generated by motor generator MG1. The driving force of motor generator MG2 is transmitted to wheels 4. Motor generator MG2 thus assists engine 2 or allows the vehicle to run with the driving force of motor generator MG2 itself. The operation of motor generator MG2 generating vehicle driving force is hereinafter referred to as power operation.

During braking of the vehicle or during acceleration reduction on a downhill, motor generator MG2 rotates to produce counter electromotive force (regenerative operation). This counter electromotive force is then converted from AC into DC by an inverter 30 (described later) of PCU 5 to be supplied to power storage unit B with the voltage adjusted by converter 10.

Power splitting device 3 distributes power between motor generators MG1, MG2 and engine 2. For example, a planetary gear train having three rotating axles of a sun gear, a planetary carrier, and a ring gear can be used as power splitting device 3. These three rotating axles are connected to the respective rotating axles of engine 2 and motor generators MG1, MG2.

Power storage unit B is a rechargeable lithium-ion secondary battery. Power storage unit B supplies DC power to PCU 5 through system main relay SMR. Power storage unit B is charged with DC power output from PCU 5. A nickel metal hydride secondary battery or an electrical double capacitor may be used as power storage unit B. System main relay SMR is disposed between power storage unit B and PCU 5.

Current sensor 50 detects current IB input/output to/from power storage unit B and outputs a detection value to ECU 40. Current sensor 50 detects current IB in a positive value during discharging from power storage unit B. On the other hand, current sensor 50 detects current IB in a negative value during charging of power storage unit B.

PCU 5 includes a converter 10, inverters 20, 30, and capacitors C1, C2.

Converter 10 includes IGBT elements Q1, Q2, diodes D1, D2, and a reactor L. IGBT elements Q1, Q2 are connected in series between a positive electrode line PL2 and a negative electrode line NL. IGBT element Q1 is connected between positive electrode line PL1 and a positive electrode line PL2 (positive electrode line on the DC side of inverters 20, 30). IGBT element Q2 is connected between positive electrode line PL1 and negative electrode line NL. That is, IGBT element Q2 is connected between a power line pair connected to power storage unit B. Diodes D1, D2 are connected in anti-parallel with IGBT elements Q1, Q2, respectively. Reactor L is connected between a connection node of IGBT elements Q1, Q2 and positive electrode line PL1. When IGBT element Q1 is turned on (electrically conducting), current output from inverters 20, 30 flows from positive electrode line PL2 to positive electrode line PL1 through IGBT element Q1. When IGBT element Q1 is turned off (electrically cut off), current output from inverters 20, 30 does not flow from positive electrode line PL2 to positive electrode line PL1.

A module including IGBT element Q1 and diode D1 hereinafter may be referred to as "upper arm". A module including IGBT element Q2 and diode D2 may be referred to as "lower arm".

Converter 10 boosts the voltage of positive electrode line PL2 to a voltage equal to or higher than that of positive electrode line PL1, based on a switching control signal PWC from ECU 40. Specifically, converter 10 stores current flowing when IGBT element Q2 is turned on, into reactor L as magnetic energy. Converter 10 then discharges energy stored in reactor L to positive electrode line PL2 through diode D1 when IGBT element Q2 is turned off.

When the on duty of IGBT element Q2 is increased, the energy stored in reactor L is increased. As a result, the voltage of positive electrode line PL2 rises. On the other hand, when the on duty of IGBT element Q1 is increased, current flowing from positive electrode line PL2 to positive electrode line PL1 is increased. As a result, the voltage of positive electrode line PL2 drops. Converter 10 can control the voltage of positive electrode line PL2 to any voltage equal to higher than that of positive electrode line PL1 by controlling the duty ratios of IGBT elements Q1, Q2.

For example, when IGBT element Q1 is fixed ON and IGBT element Q2 is fixed OFF, the voltage of power storage unit B is applied as it is to capacitor C2 without being increased by converter 10. The driving of hybrid vehicle 100 in this state is hereinafter referred to as upper arm ON running. In upper arm ON running, power supply from power storage unit B to inverters 20, 30 is performed, whereby power operation is performed by motor generators MG1, MG2. In upper arm ON running, power supply from inverters 20, 30 to power storage unit B is performed, whereby regenerative operation by motor generators MG1, MG2 is performed.

Converter 10 outputs a fail signal FCV, for example, when either IGBT element Q1 or Q2 is short-circuited. In what case fail signal FCV is output will be described in details later. Fail signal FCV is output to ECU 40, whereby ECU 40 outputs a shutdown signal SDC to converter 10. Converter 10 receives shutdown signal SDC from ECU 40 and then stops operation. When shutdown signal SDC is received by converter 10, converter 10 cuts off the gates of IGBT elements Q1, Q2.

Capacitor C1 is connected between positive electrode line PL1 and negative electrode line NL1. Voltage of power storage unit B is applied to capacitor C1. Capacitor C2 is connected between positive electrode line PL2 and negative electrode line NL. Voltage boosted by converter 10 is applied to capacitor C2.

Inverters 20, 30 are provided corresponding to motor generators MG1, MG2, respectively. Each of inverters 20, 30 is a three-phase inverter and includes six modules each including an IGBT element and a diode connected in antiparallel with the IGBT element. Inverter 20 converts counter electromotive force (three-phase AC power) produced by motor generator MG1 into DC power and outputs the converted DC power as regenerative power to positive electrode line PL2. Inverter 30 converts DC power received from positive electrode line PL2 into three-phase AC power based on a signal PWI2 from ECU 40 and outputs the converted AC power to motor generator MG2. During braking of the vehicle or during acceleration reduction on a downhill, inverter 30 converts the counter electromotive force (three-phase AC power) produced by motor generator MG2 into DC power and outputs the converted DC power as regenerative power to positive electrode line PL2.

Inverters 20, 30 receive shutdown signals SD1, SD2, respectively, from ECU 40 to stop operation. When shutdown signals SD1, SD2 are received by inverters 20, 30, respectively, inverters 20, 30 cut off the gates of all of the IGBT elements (not shown) included in the inverters.

ECU 40 generates signals PWC, PWI1, PWI2 for driving converter 10 and motor generators MG1, MG2, respectively, based on the accelerator position, the vehicle speed, and signals from sensors. ECU 40 outputs the generated signals PWC, PWI1, PWI2 to converter 10 and inverters 20, 30, respectively.

For example, assume that converter 10 fails in such a hybrid vehicle 100. If this failure is caused by short-circuiting of IGBT element Q1, current may flow in both of the direction from power storage unit B to inverter 20 and the direction from inverter 20 to power storage unit B. In this case, therefore, the same current flow is achieved as in the state in which IGBT element Q1 is fixed ON and IGBT element Q2 is fixed OFF (upper arm ON state). As a result, in this case, the substantially same running as upper arm ON running can be performed.

The inventors of the present disclosure have found that in the case where IGBT element Q1 is short-circuited, fail signal FCV is generated if an ON signal is input to IGBT element Q1.

Suppose that it is necessary to input an ON signal to IGBT element Q1 in order to perform upper arm ON running even when IGBT element Q1 is short-circuited.

In this case, first, in order to perform upper arm ON running, an ON signal is input to IGBT element Q1. Input of an ON signal to IGBT element Q1 generates fail signal FCV, and the generated fail signal FCV is output to ECU 40. ECU 40 receives fail signal FCV and outputs shutdown signal SDC to converter 10 to determine which component included in converter 10 has an abnormality. ECU 40 then determines that IGBT element Q1 is short-circuited and outputs an ON signal again to IGBT element Q1 in order to perform upper arm ON running. As described above, supposing that it is necessary to input an ON signal to IGBT element Q1 in order to perform upper arm ON running, generation of fail signal FCV associated with input of an ON signal to IGBT element Q1 and output of an ON signal to IGBT element Q1 associated with input of fail signal FCV to ECU 40 are repeated. As a result, upper arm ON running fails to be performed.

In hybrid vehicle 100 equipped with the motor drive apparatus according to the present embodiment, first, ECU 40 controls converter 10 such that converter 10 is stopped when fail signal FCV is output by converter 10 when IGBT element Q1 is short-circuited. ECU 40 then controls inverters 20, 30 such that power operation and regenerative operation (upper arm ON running) by motor generators MG1, MG2 are performed in a state in which output of an ON signal to IGBT element Q1 is set non-executable.

It can be said that IGBT element Q1 is short-circuited and therefore is electrically in a substantially ON state even without input of an ON signal. Power operation and regenerative operation by motor generators MG1, MG2 are performed in a state in which output of an ON signal to the short-circuited IGBT element Q1 is set non-executable, whereby upper arm ON running can be achieved during short-circuiting of IGBT element Q1.

Next, in what case fail signal FCV is output and the reason why upper arm ON running is performed without inputting an ON signal to IGBT element Q1 during short-circuiting of IGBT element Q1 will be described in more details.

<Conditions of Output of Fail Signal>

Figure 2:
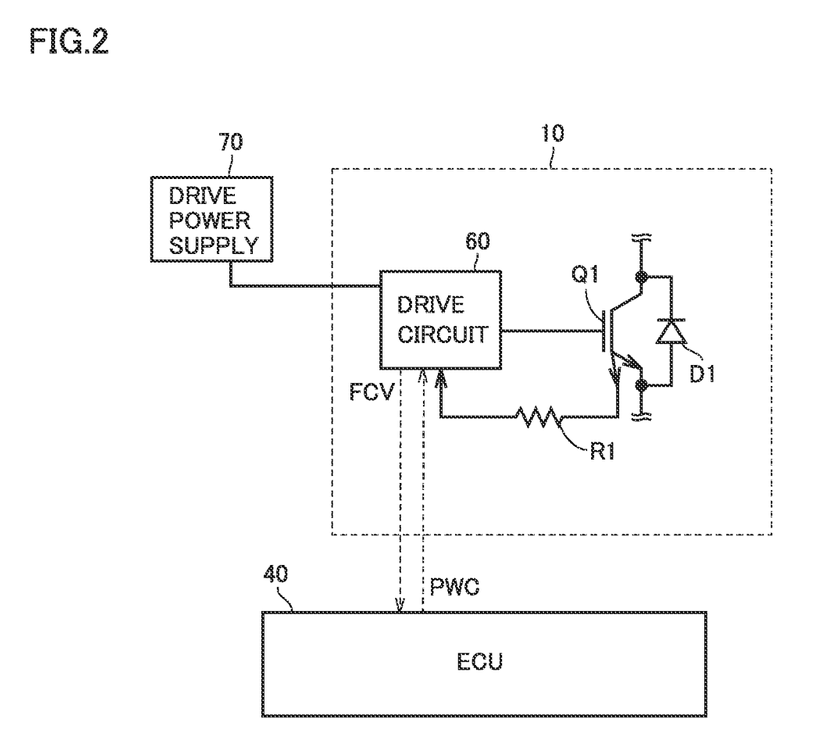
FIG. 2 is a diagram showing the relation between a drive circuit for an IGBT element and peripheral components.

FIG. 2 is a diagram for explaining a pattern in which fail signal FCV is generated by drive circuit 60. FIG. 2 is a diagram specifically focusing on drive circuit 60 connected to IGBT element Q1, among IGBT elements Q1, Q2 included in converter 10.

Referring to FIG. 2, drive circuit 60 is included in converter 10. Drive circuit 60 is connected to the gate terminal of IGBT element Q1 and drive power supply 70. Though not shown, the drive circuit for IGBT element Q2 is also included in converter 10 and has a configuration equivalent to drive circuit 60. Drive circuit 60 receives switching control signal PWC output from ECU 40 to apply a drive voltage (for example, 15 V) of drive power supply 70 to the gate terminal of IGBT element Q1. That is, drive circuit 60 receives switching control signal PWC to output an ON signal to the gate terminal of IGBT element Q1. Electrical continuity is thus established between the collector and the emitter of the IGBT element Q1.

A resistor R1 is provided between drive circuit 60 and IGBT element Q1. In resistor R1, current far smaller (for example, about 1/6000) than current flowing between the collector and the emitter of IGBT element Q1 flows. Drive circuit 60 can estimate the magnitude of current flowing between the collector and the emitter of IGBT element Q1 by detecting the magnitude of current flowing through resistor R1.

Fail signal FCV is generated by drive circuit 60 in at least two cases as follows. First, fail signal FCV is output by drive circuit 60 when current flowing through resistor R1 increases to be higher than a predetermined value. This is because when current flowing through resistor R1 increases to be higher than a predetermined value, the possibility that a short circuit is produced between the collector and the emitter of IGBT element Q1 is high. Secondly, fail signal FCV is output by drive circuit 60 when a voltage value of drive power supply 70 decreases to be lower than a predetermined value. This is because when the voltage value of drive power supply 70 decreases to be lower than a predetermined value, the possibility that some abnormality occurs in converter 10 is high.

When the collector and the emitter of IGBT element Q1 are short-circuited, IGBT element Q1 has already not functioned as a semiconductor device and also has a short circuit between the gate and the emitter. If a drive voltage of drive power supply 70 is applied to the gate terminal of IGBT element Q1 in this short-circuited state, the potential of drive power supply 70 is reduced, and the voltage of drive power supply 70 is reduced. As a result, when the voltage of drive power supply 70 decreases to be lower than a predetermined value, drive circuit 60 outputs fail signal FCV as described above.

Figure 3:
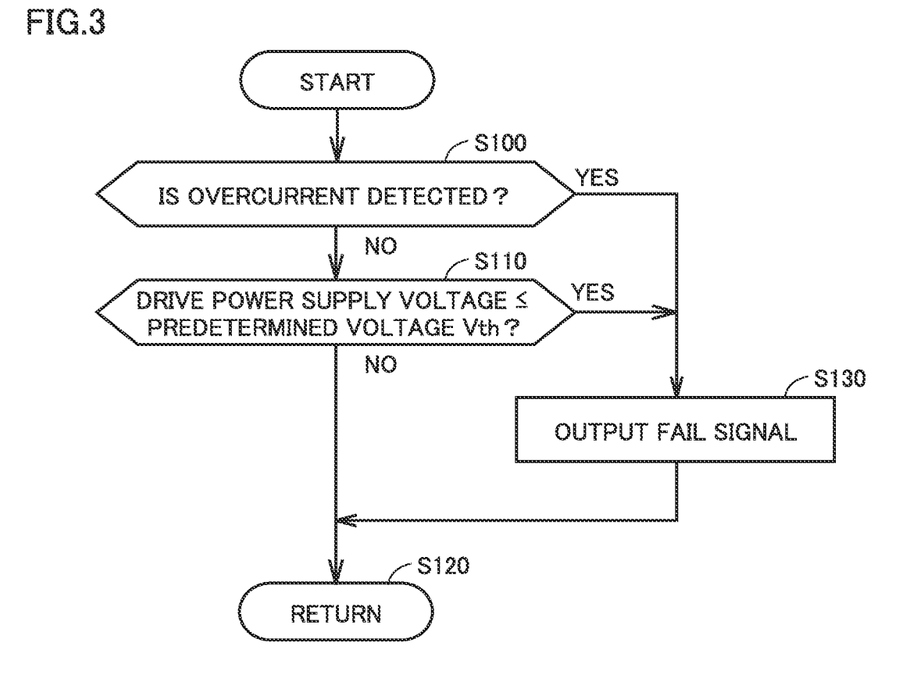
FIG. 3 is a flowchart related to output of a fail signal.

FIG. 3 is a flowchart related to output of fail signal FCV. Referring to FIG. 3, during normal running involving a voltage boost by converter 10, drive circuit 60 detects whether current flowing into drive circuit 60 through resistor R1 is equal to or higher than a predetermined value and overcurrent occurs in IGBT element Q1 (step S100). Such detection is performed because if it is detected that current flowing into drive circuit 60 is equal to or higher than a predetermined value and overcurrent occurs, the possibility that a short circuit occurs in IGBT element Q1 is high and it is necessary to generate fail signal FCV.

If it is detected that current flowing into drive circuit 60 is smaller than a predetermined value and overcurrent does not occur (NO in step S100), drive circuit 60 detects whether the drive voltage of drive power supply 70 is equal to or lower than predetermined voltage Vth (step S110). This determination is made because if the drive voltage of drive power supply 70 is equal to or lower than predetermined voltage Vth, the possibility that some abnormality occurs in converter 10 is high and it is necessary to generate fail signal FCV. If it is detected that the drive voltage of drive power supply 70 is greater than predetermined voltage Vth (NO in step S110), the process proceeds to step S120.

If it is detected that current flowing into drive circuit 60 is equal to or greater than a predetermined value and overcurrent occurs in step S100 (YES in step S100), or if it is detected that the drive voltage of drive power supply 70 is equal to or smaller than predetermined voltage Vth in step S110 (YES in step S110), drive circuit 60 generates fail signal FCV and outputs the generated fail signal FCV to ECU 40. If fail signal FCV is output, the process proceeds to step S120.

As described above, if an ON signal is input to the short-circuited IGBT element Q1, the drive voltage of drive power supply 70 decreases. That is, in performing upper arm ON running, if an ON signal is input to the short-circuited IGBT element Q1, the drive voltage of drive power supply 70 decreases to predetermined voltage Vth or lower, and fail signal FCV is generated. Input of fail signal FCV to ECU 40 stops converter 10. Supposing that an ON signal is input to IGBT element Q1 in order to perform upper arm ON running, an ON signal is input to IGBT element Q1 again. As a result, generation of fail signal FCV associated with input of an ON signal to IGBT element Q1 and output of an ON signal to IGBT element Q1 associated with input of fail signal FCV to ECU 40 are repeated, so that upper arm ON running fails to be performed.

In hybrid vehicle 100 equipped with the motor drive apparatus according to the present embodiment, therefore, when IGBT element Q1 is short-circuited, power operation and regenerative operation by motor generators MG1, MG2 (upper arm ON running) are performed in a state in which input of an ON signal to IGBT element Q1 is set non-executable.

Thus, when a short circuit occurs in IGBT element Q1, an ON signal is not input to IGBT element Q1, so that fail signal FCV is not generated, and upper arm ON running can be achieved. Next, the transitional operation to upper arm ON running during short-circuiting of IGBT element Q1 will be described.

<Transitional Operation to Upper Arm ON Running>

Figure 4:
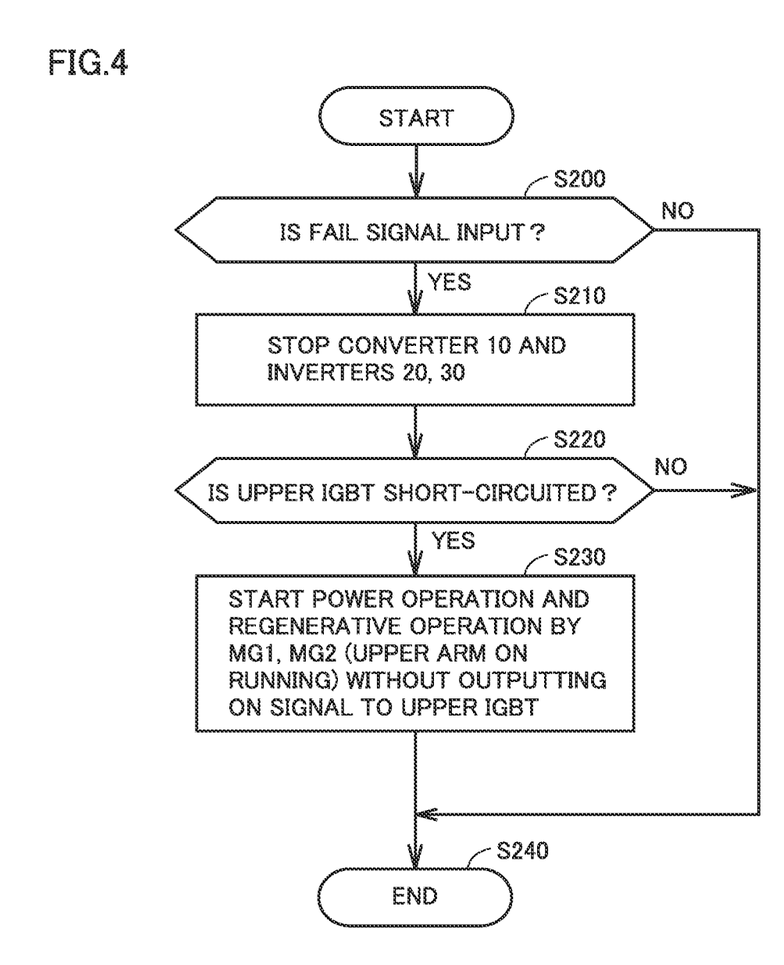
FIG. 4 is a flowchart showing transitional operation to upper arm ON running during short-circuiting of the upper IGBT element.

FIG. 4 is a flowchart showing transitional operation to upper arm ON running during short-circuiting of IGBT element Q1. Referring to FIG. 4, during normal running involving a voltage boost by converter 10, ECU 40 determines whether fail signal FCV is input (step S200). If it is determined that fail signal FCV is not input (NO in step S200), the process proceeds to step S240.

If it is determined that fail signal FCV is input (YES in step S200), ECU 40 outputs shutdown signal SDC to converter 10 and outputs shutdown signals SD1, SD2 to inverters 20, 30, respectively (step S210). Converter 10 and inverters 20, 30 are thus stopped. The reason why not only converter 10 but also inverters 20, 30 are stopped when fail signal FCV due to an abnormality in converter 10 is input will be described.

For example, assume that short-circuiting of IGBT element Q2 causes output of fail signal FCV. In this case, if inverters 20, 30 are operative, electric power generated by motor generators MG1, MG2 is not supplied to power storage unit B but rapidly stored in capacitor C2 because IGBT element Q1 is in an off state. If electric power generated by motor generators MG1, MG2 exceeds the capacity of capacitor C2, capacitor C2 may fail. In order to prevent such a situation, ECU 40 stops not only converter 10 but also inverters 20, 30 when fail signal FCV is input.

If converter 10 and inverters 20, 30 are stopped in step S210, ECU 40 determines whether IGBT element Q1 is short-circuited (step S220). A variety of known methods can be used as a method of determining whether, among the upper and lower IGBT elements included in converter 10, the upper IGBT element Q1 is short-circuited.

For example, ECU 40 can determine whether the upper IGBT element Q1 is short-circuited by monitoring output of current sensor 50 after converter 10 stops. Even when converter 10 and inverters 20, 30 stop, regenerative power is produced if the rotational speeds of motor generators MG1, MG2 are high and counter electromotive force is large. When converter 10 stops, if IGBT element Q1 is not short-circuited, IGBT element Q1 is electrically cut off. In this case, therefore, current sensor 50 does not detect current (current in a negative value) that charges power storage unit B. On the other hand, if IGBT element Q1 is short-circuited, IGBT element Q1 is electrically conducting even though converter 10 is stopped. In this case, therefore, current sensor 50 detects current (current in a negative value) that charges power storage unit B. ECU 40 thus can determine whether the upper IGBT element Q1 is short-circuited by monitoring output of current sensor 50 after converter 10 stops.

If it is determined that IGBT element Q1 is not short-circuited in step S220 (NO in step S220), the process proceeds to step S240. For example, in this case, system main relay SMR may be cut off because IGBT element Q2 may be short-circuited. On the other hand, if it is determined that IGBT element Q1 is short-circuited in step S220 (YES in step S220), ECU 40 controls inverters 20, 30 such that power operation and regenerative operation by motor generators MG1, MG2 are performed in a state in which output of an ON signal to IGBT element Q1 is set non-executable. That is, ECU 40 controls inverters 20, 30 such that upper arm ON running is performed in a state in which output of an ON signal to IGBT element Q1 is set non-executable (step S230).

For example, power operation by motor generator MG2 is performed in a state in which IGBT element Q1 is short-circuited, whereby hybrid vehicle 100 runs. When the SOC (State of Charge) of power storage unit B is equal to or smaller than a predetermined level in a state in which IGBT element Q1 is short-circuited, regenerative operation by motor generator MG1 is performed to charge power storage unit B. In this hybrid vehicle 100, therefore, as compared with when upper arm ON running is not performed during short-circuiting of IGBT element Q1 (when electric power of power storage unit B is merely consumed), the distance of travel during short-circuiting of IGBT element Q1 can be increased. It is noted that in upper arm ON running, power operation and regenerative operation by motor generators MG1, MG2 are not necessarily performed consistently but performed as necessary depending on, for example, the driver's request or conditions such as the SOC of power storage unit B.

As described above, in hybrid vehicle 100 equipped with the motor drive apparatus according to the present embodiment, when fail signal FCV is input to ECU 40 in the case where IGBT element Q1 is short-circuited, power operation and regenerative operation by motor generators MG1, MG2 (upper arm ON running) are performed in a state in which output of an ON signal to IGBT element Q1 is set non-executable.

Accordingly, fail signal FCV associated with input of an ON signal to the upper IGBT element Q1 is not generated during short-circuiting of IGBT element Q1, and upper arm ON running can be achieved.

Since output of an ON signal to the short-circuited IGBT element Q1 is set non-executable, the voltage of drive power supply 70 for the upper IGBT element Q1 does not decrease to predetermined voltage Vth or lower. Thus, fail signal FCV due to a voltage drop of drive power supply 70 is not generated, and upper arm ON running can be achieved.

Other Embodiments

The first embodiment has been described above as an embodiment of the present disclosure. The present disclosure, however, is not intended to be limited to this embodiment. An example of other embodiments will be described here.

In the first embodiment, the switching elements included in converter 10 are IGBT elements Q1, Q2. The present disclosure, however, is not limited to such an example. For example, in place of IGBT elements, power switching elements such as power MOSFETs (Metal Oxide Semiconductor Field-Effect Transistors) may be used.

In the first embodiment, ECU 40 stops not only converter 10 but also inverters 20, 30 when receiving fail signal FCV. The present disclosure, however, is not limited to such a configuration. For example, ECU 40 may be configured such that converter 10 alone is stopped when receiving fail signal FCV. Though not necessarily required, for example, if the capacity of capacitor C2 is large, inverters 20, 30 may not be stopped even when converter 10 has an abnormality.

In the first embodiment, a series/parallel-type hybrid vehicle has been described in which power of engine 2 is split by power splitting device 3 to be transmitted to wheels 4 and motor generator MG1. The technique disclosed here, however, is not limited to application to such an example. For example, the technique disclosed here is applicable to hybrid vehicles of any other types. For example, the technique disclosed here may be applied to a series-type hybrid vehicle in which engine 2 is used only for driving motor generator MG1 and driving force of the vehicle is produced by motor generator MG2 alone, a hybrid vehicle in which, among kinetic energies generated by the engine, regenerative energy alone is recovered as electric energy, and a motor-assist type hybrid vehicle in which the engine is the main power source and assisted by a motor as necessary.

The technique disclosed here may also be applied to electric automobiles running on electricity alone without engine 2 and general electrically powered vehicles such as fuel cell vehicles further including fuel cells as a power supply.

Power storage unit B is an embodiment of the "power storage device" in the present disclosure. Inverters 20, 30 are an embodiment of the "inverter" in the present disclosure. Converter 10 is an embodiment of the "converter" in the present disclosure. ECU 40 is an embodiment of the "control device" in the present disclosure. IGBT element Q1 is an embodiment of the "upper switching element" in the present disclosure. IGBT element Q2 is an embodiment of the "lower switching element" in the present disclosure. Fail signal FCV is an embodiment of the "fail signal" in the present disclosure. Motor generators MG1, MG2 are an embodiment of the "motor" in the present disclosure.

Although the present disclosure has been described and illustrated in detail, it is clearly understood that the same is by way of illustration and example only and is not to be taken by way of limitation, the scope of the present subject matter being interpreted by the terms of the appended claims.

What is claimed is:

1. A motor drive apparatus comprising:
   a power storage device;
   an inverter configured to drive a motor;
   a converter provided between the power storage device and the inverter and configured to boost input voltage of the inverter to a voltage equal to or higher than voltage of the power storage device; and
   a control device configured to control the inverter and the converter,
   the converter including an upper switching element connected between a positive electrode line of a power line pair connected to the power storage device and a positive electrode line on a direct current side of the inverter, and a lower switching element connected between the power line pair,
   the converter being configured to output a fail signal when the upper switching element becomes short-circuited or when an ON signal is input to the upper switching element in a short-circuited state, and the control device being configured to:
control the converter to be stopped when the fail signal is output; and
control the inverter such that power operation and regenerative operation by the motor are performed in a state in which output of an ON signal to the upper switching element is set non-executable, when the fail signal is output due to short circuit of the upper switching element.

2. An electrically powered vehicle comprising:
a power storage device;
a motor configured to generate driving force for traveling;
an inverter configured to drive the motor;
a converter provided between the power storage device and the inverter and configured to boost input voltage of the inverter to a voltage equal to or higher than voltage of the power storage device; and
a control device configured to control the inverter and the converter,
the converter including an upper switching element connected between a positive electrode line of a power line pair connected to the power storage device and a positive electrode line on a direct current side of the inverter, and a lower switching element connected between the power line pair,
the converter being configured to output a fail signal when the upper switching element becomes short-circuited or when an ON signal is input to the upper switching element in a short-circuited state, and
the control device being configured to:
control the converter to be stopped when the fail signal is output; and
control the inverter such that power operation and regenerative operation by the motor are performed in a state in which output of an ON signal to the upper switching element is set non-executable, when the fail signal is output due to short circuit of the upper switching element.

3. A method of controlling a motor drive apparatus,
the motor drive apparatus including:
a power storage device;
an inverter configured to drive a motor; and
a converter provided between the power storage device and the inverter and configured to boost input voltage of the inverter to a voltage equal to or higher than voltage of the power storage device,
the converter including an upper switching element connected between a positive electrode line of a power line pair connected to the power storage device and a positive electrode line on a direct current side of the inverter, and a lower switching element connected between the power line pair,
the converter being configured to output a fail signal when the upper switching element becomes short-circuited or when an ON signal is input to the upper switching element in a short-circuited state,
the method comprising:
controlling the converter to be stopped when the fail signal is output; and
controlling the inverter such that power operation and regenerative operation by the motor are performed in a state in which output of an ON signal to the upper switching element is set non-executable, when the fail signal is output due to short circuit of the upper switching element.

* * * * *

UNITED STATES PATENT AND TRADEMARK OFFICE
CERTIFICATE OF CORRECTION

PATENT NO. : 10,046,645 B2
APPLICATION NO. : 15/229627
DATED : August 14, 2018
INVENTOR(S) : Tomoko Oba and Atsushi Nomura It is certified that error appears in the above-identified patent and that said Letters Patent is hereby corrected as shown below:

In Column 1, Line 30, delete "upper anti" and insert --upper arm--, therefor.

Signed and Sealed this
Twenty-fifth Day of September, 2018

Andrei Iancu
*Director of the United States Patent and Trademark Office*